(12) United States Patent
Takamura et al.

(10) Patent No.: US 6,844,532 B2
(45) Date of Patent: Jan. 18, 2005

(54) MOSI$_2$ ARC-SHAPED HEATER, AND METHOD AND DEVICE FOR MANUFACTURING THE HEATER

(75) Inventors: Hiroshi Takamura, Ibaraki (JP); Daisuke Takagaki, Ibaraki (JP)

(73) Assignee: Nikko Materials Company, Limited, Tokyo (JP)

( * ) Notice: Subject to any disclaimer, the term of this patent is extended or adjusted under 35 U.S.C. 154(b) by 0 days.

(21) Appl. No.: 10/399,896
(22) PCT Filed: Feb. 4, 2002
(86) PCT No.: PCT/JP02/00870
§ 371 (c)(1), (2), (4) Date: Apr. 23, 2003
(87) PCT Pub. No.: WO02/091800
PCT Pub. Date: Nov. 14, 2002

(65) Prior Publication Data
US 2004/0094536 A1 May 20, 2004

(30) Foreign Application Priority Data
Apr. 27, 2001 (JP) .......................... 2001-131559

(51) Int. Cl.$^7$ .............................. H05B 3/64; H05B 3/12
(52) U.S. Cl. ......................... 219/548; 219/56; 219/553; 29/611
(58) Field of Search ................................. 219/548, 538, 219/552, 553, 390, 59.1, 56, 58; 373/117, 132, 133, 134; 29/611

(56) References Cited

U.S. PATENT DOCUMENTS

| | | | |
|---|---|---|---|
| 3,668,599 A | * 6/1972 | Schrewelius | 219/532 |
| 3,912,905 A | * 10/1975 | Giler | 338/218 |
| 4,016,403 A | * 4/1977 | Best | 219/552 |
| 4,147,888 A | * 4/1979 | Sato | 219/552 |
| 4,266,119 A | * 5/1981 | Best | 219/552 |
| 4,267,435 A | * 5/1981 | Best | 219/552 |
| 5,324,920 A | 6/1994 | Nakao | 219/542 |
| 5,425,496 A | * 6/1995 | Zhu et al. | 228/234.3 |
| 5,473,141 A | * 12/1995 | Makris et al. | 219/552 |
| 5,507,639 A | 4/1996 | Monoe | 432/77 |

FOREIGN PATENT DOCUMENTS

| | | |
|---|---|---|
| JP | 04-110104 | 4/1992 |
| JP | 04-155822 | 5/1992 |
| JP | 07-018447 | 1/1995 |
| JP | 08-143365 | 6/1996 |
| JP | 10-291875 | 11/1998 |

OTHER PUBLICATIONS

Patent Abstracts of Japan, One page English Abstract of JP 07-018447.

(List continued on next page.)

Primary Examiner—Teresa J. Walberg
(74) Attorney, Agent, or Firm—Howson and Howson

(57) ABSTRACT

A MoSi$_2$ arc-shaped heater formed in a continuous waveform, characterized in that U-shaped heater members having parallel parts are connected alternately to each other at the end parts, and the parallel faces of the U-shaped heater members have an angle relative to each other and an arc-shaped face with a specified curvature in a connecting direction, wherein a large number of parallel U-shaped heater members having heating parts are connected to each other and welded so that the heater can have a generally arc-shaped curved surface to install the heater onto the inner wall of a heating furnace, whereby the arc heater having an excellent joining strength and capable of being manufactured stably, and a method and a device for manufactured the heater can be provided.

15 Claims, 3 Drawing Sheets

OTHER PUBLICATIONS

Patent Abstracts of Japan, One page English Abstract of JP 04–155822.
Patent Abstracts of Japan, One page English Abstract of JP 08–143365.
Patent Abstracts of Japan, One page English Abstract of JP 10–291875.
Patent Abstracts of Japan, One page English Abstract of JP 04–110104.

* cited by examiner

MOSI₂ ARC-SHAPED HEATER, AND METHOD AND DEVICE FOR MANUFACTURING THE HEATER

FIELD OF THE INVENTION

The present invention pertains to a $MoSi_2$ arc-shaped heater for use in the likes of a heating furnace and which is superior in joining strength and capable of being manufactured stably, and to a method and a device for manufacturing such a heater. Further, the $MoSi_2$ heater used in the present specification includes heaters having $MoSi_2$ as its principal component with increased electrical resistance in which insulative oxides or the like are included in pure $MoSi_2$, or $MoSi_2$.

BACKGROUND OF THE INVENTION

Since a heater having Molybdenum Disilicide ($MoSi_2$) as its principal component possesses superior oxidation resistance characteristics, it has been placed on the market from around 1950 to 1960 as an ultrahigh temperature heater to be used particularly in an atmospheric or oxidizing atmosphere, and it is still being used today for various purposes. This heater, as its principal component, contains 70 wt % or more of $MoSi_2$.

Conventionally, a heater employed in various fields such as the glass industry or for ceramics calcination has a shape in which a heating part (moreover, a "heating part" usually means the portion of the heater having a small diameter (excluding terminal parts) that mainly generates heat during energization) forms a single U shape (2-shank shape) and is mounted by being suspended from the ceiling or sidewall of the furnace, whereby the maximum temperature during use of such furnace reaches 1700 to 1850° C.

In recent years, pursuant to the miniaturization of semiconductor devices, reduction of device manufacturing time and energy conservation, heaters having $MoSi_2$ as its principal component are now being used in semiconductor manufacturing devices such as single crystal growth furnaces and diffusion furnaces in which metal heating elements were conventionally employed.

A heater having $MoSi_2$ as its principal component possesses superior heat resistance characteristics and is capable of enduring a surface load of approximately ten times that of metal heating elements, and further possesses a significant characteristic in that it is capable of rapid heating and temperature rising.

Generally speaking, a heat treating furnace employed in semiconductor manufacturing devices is demanded of extreme high-precision temperature characteristics such as stringently controlling the temperature distribution within the furnace.

As a heater having $MoSi_2$ as its principal component, generally employed is a U-shaped heater in which terminal parts are welded to both ends of a U-shaped heating part as shown in FIG. 5. The U-shaped heater 21 shown in FIG. 5 is structured of a heating part 22, a welding part 23, a grip (terminal) part 24, and an electrode part 25.

Nevertheless, since the terminal parts have a greater temperature reduction in comparison to the heating part, in a furnace requiring precise temperature control as described above, a (multi shank) heater has been proposed in which a plurality of U-shaped heating parts are connected in order to reduce the terminal parts.

With the shape of this type of multi-connected heater, since the number of terminal parts penetrating in and out of the furnace will decrease, heat loss released from the terminal parts can be reduced, and may have a certain effect in ensuring the uniform temperature within the furnace.

Nevertheless, in order to dispose a heater in an arc shape throughout the inside of a heating furnace or the like, it is necessary to bend the heater, which is planimetrically joined in a waveform, in an overall arc shape. In order to bend a heater having $MoSi_2$ as its principal component, it is necessary to heat it to a high temperature of roughly 1500° C., and, since it is already joined in a waveform, there is a problem in that it is extremely difficult to make this into an arc shape, and it is difficult to manufacture a high precision heater.

Further, when the joining is not accurate or sufficient, there were accidents where the welded portion would rupture.

OBJECT OF THE INVENTION

An object of the present invention is to provide a $MoSi_2$ arc-shaped heater wherein a large number of parallel U-shaped heater members having heating parts are connected to each other and welded so that the heater can have a generally arc-shaped curved surface for installing such heater onto the inner wall of a heating furnace, which is superior in joining strength and capable of being manufactured stably, and a method and a device for manufactured such a heater.

SUMMARY OF THE INVENTION

In order to achieve the foregoing object, as a result of intense study, the present inventors have discovered that a $MoSi_2$ arc-shaped heater can be accurately and stably manufactured by devising the disposition of $MoSi_2$ U-shaped heater members during the welding thereof, and the supporting method of such welded U-shaped heater members.

Based on the foregoing discovery, the present invention provides:

1. A $MoSi_2$ arc-shaped heater formed in a continuous waveform, characterized in that U-shaped heater members having parallel parts are connected alternately to each other at the end parts, and the parallel faces of the U-shaped heater members have an angle relative to each other and an arc-shaped face with a specified curvature in a connecting direction;
2. A $MoSi_2$ arc-shaped heater according to paragraph 1 above, characterized in comprising a curvature approximately coinciding with the inner wall curved surface of a heating furnace;
3. A $MoSi_2$ arc-shaped heater according to paragraph 1 or paragraph 2 above, characterized in comprising a shape in which the continuous $MoSi_2$ arc-shaped heaters are disposed half way or all around the inner wall of the heating furnace;
4. A manufacturing method of a $MoSi_2$ arc-shaped heater for forming a continuous waveform in which U-shaped heater members having parallel parts are connected alternately to each other at the end parts, characterized in that the end faces are aligned while each U-shaped heater member is retained in parallel during the connection, each U-shaped heater member is welded while an angle relative to each other is given to the parallel faces thereof, and an arc-shaped face with a specified curvature in a connecting direction is obtained thereby;
5. A manufacturing method of a $MoSi_2$ arc-shaped heater, characterized in that, with the two series-connected $MoSi_2$ arc-shaped heater members having a specified arc length in which U shapes are connected alternately to each other to form a continuous waveform, the end face of a U-shaped heater member located at the end of an arc-shaped heater member is aligned while the arc-shaped heater member is retained in parallel, each U-shaped heater member is welded while an angle relative to each other is given to the parallel faces thereof, whereby the two series-connected $MoSi_2$ arc-shaped heater members are joined at the same time, and an arc-shaped face with a specified curvature in a connecting direction is obtained thereby;

6. A manufacturing method of a $MoSi_2$ arc-shaped heater according to paragraph 5 above, characterized in that the two series-connected $MoSi_2$ arc-shaped heater members are heater members formed in a U-shape through welding or bending;

7. A manufacturing method of a $MoSi_2$ arc-shaped heater according to each of paragraphs 4 to 6 above, characterized in that the parallel faces of the U-shaped heater members are given an angle relative to each other by employing an arc-shaped guide for guiding and supporting the connected U-shaped heater members;

8. A manufacturing method of a $MoSi_2$ arc-shaped heater according to each of paragraphs 4 to 7 above, characterized in comprising a curvature approximately coinciding with the inner wall curved surface of a heating furnace;

9. A manufacturing method of a $MoSi_2$ arc-shaped heater according to each of paragraphs 4 to 8 above, characterized in comprising a shape in which the continuous $MoSi_2$ arc-shaped heaters are disposed half way or all around the inner wall of the heating furnace;

10. A manufacturing device of a $MoSi_2$ arc-shaped heater for forming a continuous waveform in which U-shaped heater members having parallel parts are connected alternately to each other at the end parts, or for joining at the same time two series-connected $MoSi_2$ arc-shaped heater members having a specified arc length in which U shapes are connected alternately to each other to form a continuous waveform, characterized in that the end faces are aligned while each U-shaped heater member is retained in parallel during the connection, and each U-shaped heater member is welded while an angle relative to each other is given to the parallel faces thereof, or characterized in that the end faces are aligned while each U-shaped heater member is retained in parallel during the connection and providing an electrode to be welded in which each U-shaped heater member is welded while an angle relative to each other is given to the parallel faces thereof; and an arc-shaped face with a specified curvature in a connecting direction is obtained thereby;

11. A manufacturing device of a $MoSi_2$ arc-shaped heater according to paragraph 10 above, characterized in that the two series-connected $MoSi_2$ arc-shaped heater members are heater members formed in a U-shape through welding or bending;

12. A manufacturing device of a $MoSi_2$ arc-shaped heater according to paragraph 10 or paragraph 11 above, characterized in that the U-shaped heater member is retained between the electrodes, one end of each of the U-shaped heater members are made to contact each other, and the joint surface is mutually pressurized and welded through electrical heating;

13. A manufacturing device of a $MoSi_2$ arc-shaped heater according to paragraph 12 above, characterized in that a guide for mutually retaining in parallel each U-shaped heater member is provided to the electrodes retaining the U-shaped heater member therebetween;

14. A manufacturing device of a $MoSi_2$ arc-shaped heater according to each of paragraphs 10 to 13 above, characterized in that an arc-shaped guide for guiding and supporting the connected U-shaped heater members or arc-shaped heater members is provided in the connecting direction of the U-shaped heater members or arc-shaped heater members;

15. A manufacturing device of a $MoSi_2$ arc-shaped heater according to paragraph 14 above, characterized in that the arc-shaped guide for guiding and supporting the connected U-shaped heater members or arc-shaped heater members comprises a curvature approximately coinciding with the inner wall curved surface of a heating furnace;

16. A manufacturing device of a $MoSi_2$ arc-shaped heater according to each of paragraphs 10 to 15 above, characterized in that the electrodes retaining the U-shaped heater member therebetween comprises a structure capable of respectively operating vertically and in a direction of mutually separating from or contacting each other;

17. A manufacturing device of a $MoSi_2$ arc-shaped heater according to paragraph 16 above, characterized in that at least one of the electrodes retaining the U-shaped heater member therebetween is activated with a fluid pressure device;

18. A manufacturing device of a $MoSi_2$ arc-shaped heater according to paragraph 16 or paragraph 17 above, characterized in that the retention position of the electrodes retaining the U-shaped heater member therebetween is of a position slightly in front of the connecting direction of the U-shaped heater member than the working point of the fluid pressure device;

19. A manufacturing device of a $MoSi_2$ arc-shaped heater according to each of paragraphs 14 to 18 above, characterized in that an insulating body for preventing short circuits is provided to the curved surface part of the arc-shaped guide; and 20. A manufacturing device of a $MoSi_2$ arc-shaped heater according to each of paragraphs 14 to 19 above, characterized in that an adhesive or cohesive material is provided to the curved surface part of the arc-shaped guide.

DETAILED DESCRIPTION OF THE PREFERRED EMBODIMENTS

Generally speaking, a $MoSi_2$ arc-shaped heater is mounted on the inner wall of a furnace by penetrating its terminal through the hole provided to a fire-resistant furnace wall. As one reason the temperature within the furnace becomes uneven, it could be said that heat is released via this terminal or from such through-hole and the temperature of the terminal (vicinity) is thereby reduced.

Therefore, there is a problem in that more the terminals, soaking of the furnace becomes worse. As a method of overcoming this problem, the number of terminals can be reduced as much as possible, but it is desirable to make U-shaped heaters have a structure of being connected half way or all around along the inner wall of a cylindrical furnace. For example, if it is of a half way connected structure, the number of terminals will be four, and if it is of an all around connected structure, the number of terminals will be 2, thereby decreasing the number of terminals effectively.

Nevertheless, it is not an easy task to further take the foregoing $MoSi_2$ arc-shaped heater forming a planar continuous waveform in which U-shaped heater members having parallel parts are connected alternately to each other at the end parts, and heat it to a higher temperature and bend it into an arc shape.

The present invention provides a method and a device for manufacturing a $MoSi_2$ arc-shaped heater capable of being precisely and stably welded, by electrically heating U-shaped heater members having parallel parts.

The present invention is now explained with reference to the drawings.

Figure 1:
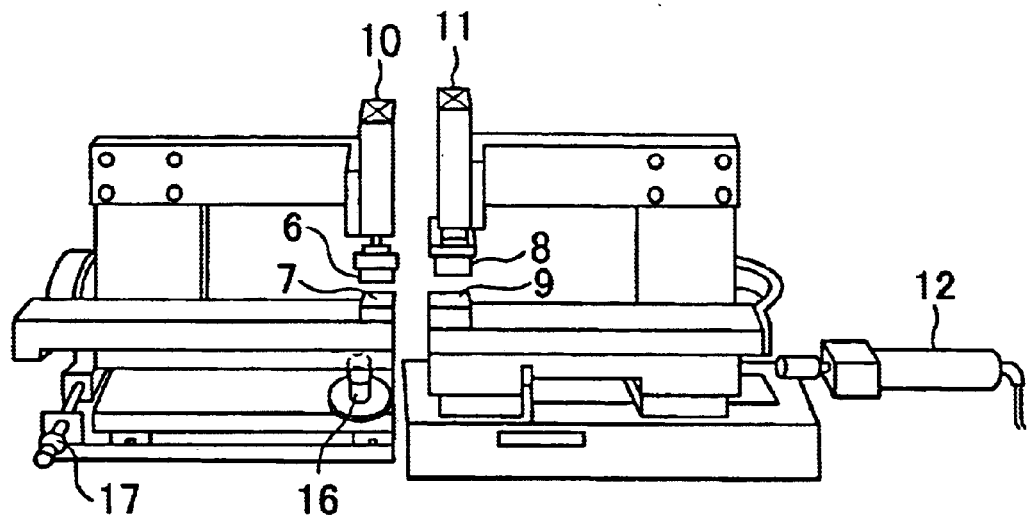
FIG. 1 is a perspective view showing the appearance of a manufacturing device of a $MoSi_2$ arc-shaped heater for welding U-shaped heater members.
Figure 2:
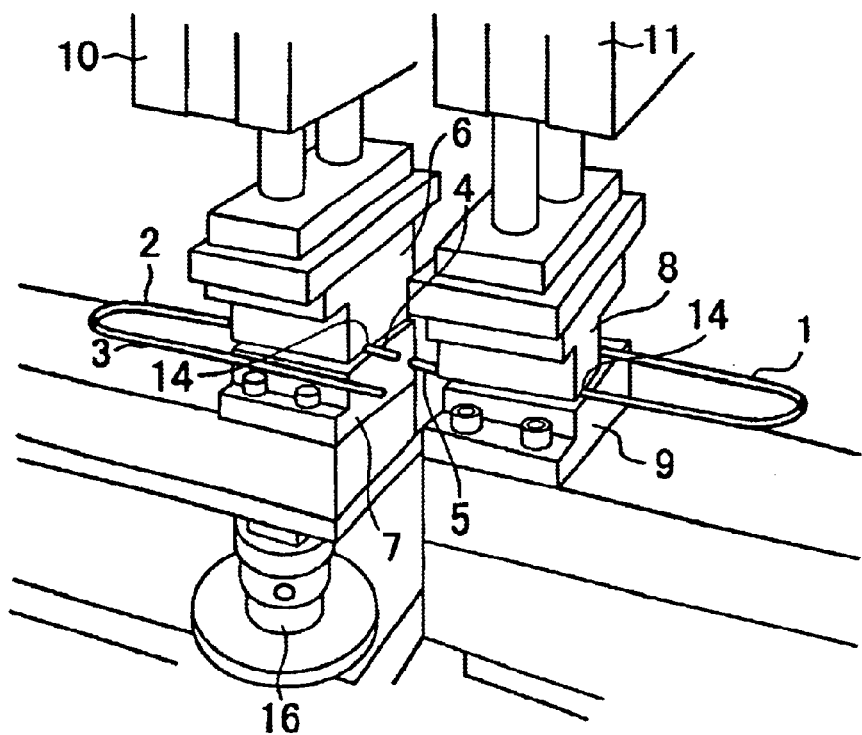
FIG. 2 is a right perspective view showing the appearance of a manufacturing device of a $MoSi_2$ arc-shaped heater illustrating a condition where two U-shaped heater members are alternately loaded and connected.

FIG. 1 is an explanatory diagram showing the appearance of the device upon welding $MoSi_2$ U-shaped heater members, and FIG. 2 is a perspective view of the device for forming a continuous waveform by connecting alternately to each other the $MoSi_2$ U-shaped heater members 1 having parallel parts 2, 3 and alternately displacing and connecting the end parts 4, 5. Upon connection, for instance, two U-shaped heater members 1 are retained between the vertical electrodes 6, 7 and between electrodes 8, 9, respectively, one end of the U-shaped heater members 1 are made to contact each other, and welded through energization.

Here, it is necessary to align the end faces while retaining in parallel each of the U-shaped heater members 1, and the foregoing vertical electrodes 6, 7 and 8, 9 are respectively required to comprise a structure capable of being adjusted in vertical and cross directions as well as in the direction allowing the separation from and contact with each other. Moreover, the electrodes are formed of materials such as copper. Further, as a means for retaining the heater member therebetween, the use of fluid pressure devices 10, 11 such as air cylinders or hydraulic cylinders is appropriate. Otherwise, a mechanical means such as a crank mechanism may also be employed.

In order to maintain the mutual parallelism of the $MoSi_2$ U-shaped heater members 1 to be connected, it is desirable that a guide is provided to the surface of the electrodes for aligning the $MoSi_2$ U-shaped heater members 1. This guide may be a convex guide 13 or a groove guide 14 aligned to the parallel parts of the U-shaped heater members 1.

Moreover, it is desirable that the retention position of the vertical electrodes 6, 7 and electrodes 8, 9 retaining each of the U-shaped heater members 1 therebetween is positioned slightly forward of the connecting direction of the U-shaped heater member 1 than the working point of the fluid pressure device. Thereby, L-shaped terminal parts may also be welded, and the connecting operation and connecting (welding) status can be easily observed.

Only one pair of the vertical electrodes retaining this U-shaped heater member 1 therebetween may be made to move, and the other pair may be fixed. Nevertheless, in order to completely align the joint surface of the end parts 4, 5 of the U-shaped heater member 1, it is desirable that the structure enables mutual fine adjustments. It is also important that the vertical electrodes retaining the U-shaped heater member 1 therebetween are able to move horizontally.

This is because an appropriate amount of pressure is necessary upon retaining each of the U-shaped heater members 1 between the respective electrodes, making one end of the respective U-shaped heater members 1 to mutually contact each other, and welding this through energization. As a means for realizing the above, it is appropriate to employ a fluid pressure device (pressurization cylinder) 12 such as an air cylinder or hydraulic cylinder as illustrated in FIG. 1.

In this case also, only one pair of the electrodes retaining the U-shaped heater member 1 therebetween may be made to move horizontally, and the other pair may be fixed.

Upon welding, it is necessary that the connecting end faces of each U-shaped heater member 1 be aligned properly. If this is insufficient, an accident of rupturing from the connecting part may occur easily.

In FIG. 1 and FIG. 2, reference numeral 16 represents the vertical adjuster of the electrodes, and reference numeral 17 represents the cross direction adjuster of the electrodes.

In the foregoing description, although only the step of simply connecting alternately to each other the $MoSi_2$ U-shaped heater member 1 having parallel parts 2, 3 and alternately displacing and connecting the end parts 4, 5 was illustrated, the target $MoSi_2$ arc-shaped heater cannot be obtained since only a planar continuous wave will be formed in the foregoing situation.

Here, it is necessary to give the parallel faces of each U-shaped heater member 1 an angle relative to each other and to weld such faces. Thereby, although each individual U-shaped heater member 1 will have parallel parts within the same plane, between the other U-shaped heater members 1, such parallel parts are not on the same plane. In other words, by repeating this kind of connection, the U-shaped heater members 1 are in succession joined to each other and connected in an arc, whereby obtained is a MoSi2 arc-shaped heater.

In addition, adjusting the said angle could change the curvature of the curved surface of the arc-shaped heater or the size of the arc.

Figure 3:
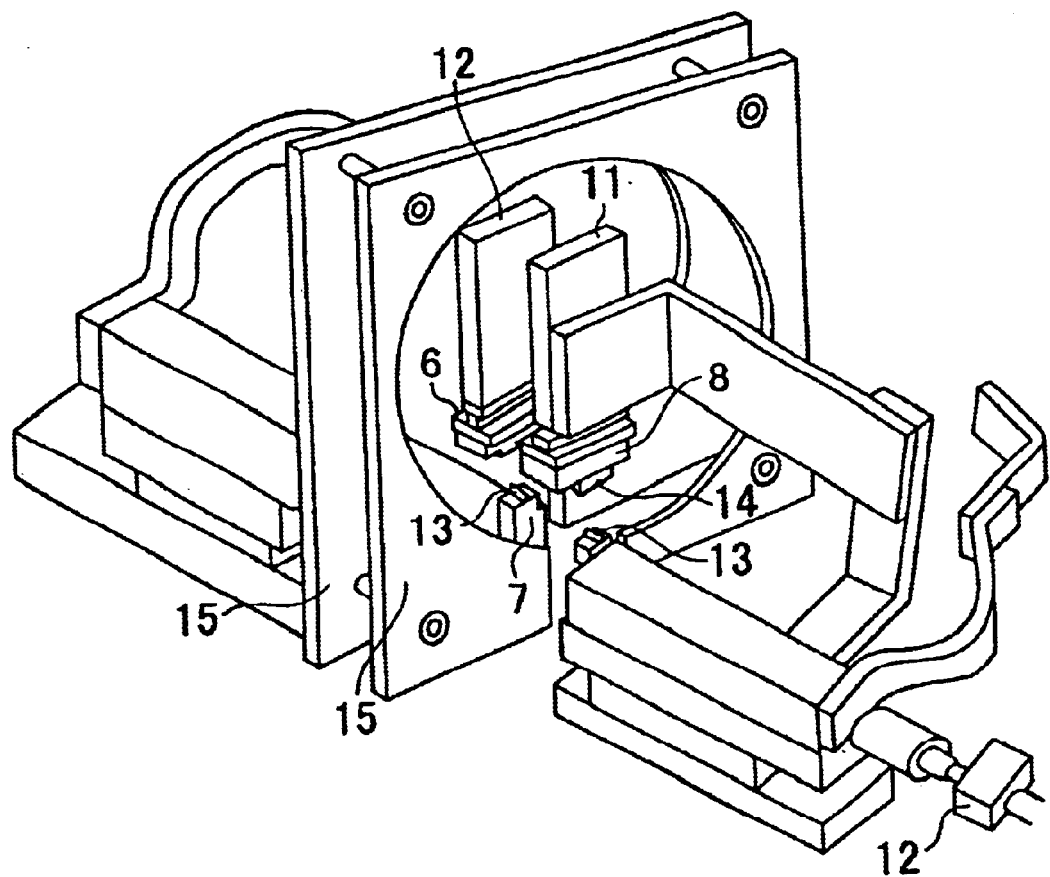
FIG. 3 is a right perspective view showing the appearance of a manufacturing device of a $MoSi_2$ arc-shaped heater provided with arc-shaped guides.
Figure 4:
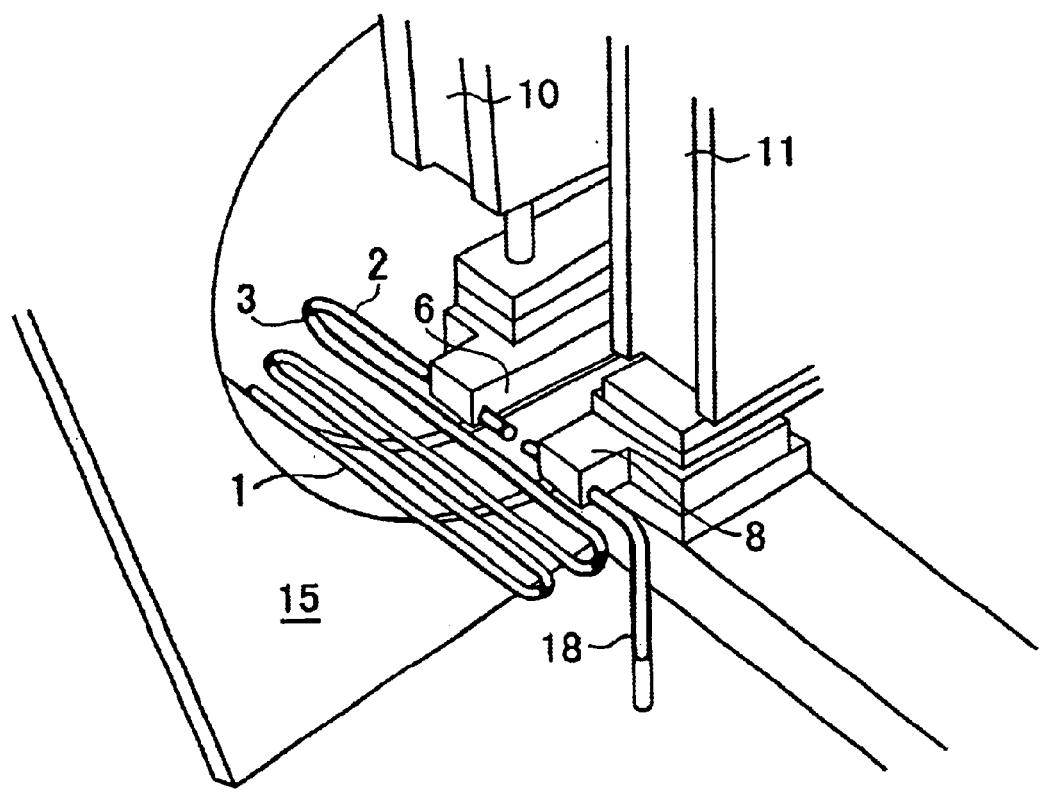
FIG. 4 is a partial explanatory diagram showing the conditions where U-shaped heater members that have been joined along the arc-shaped guide are being connected.
Figure 5:
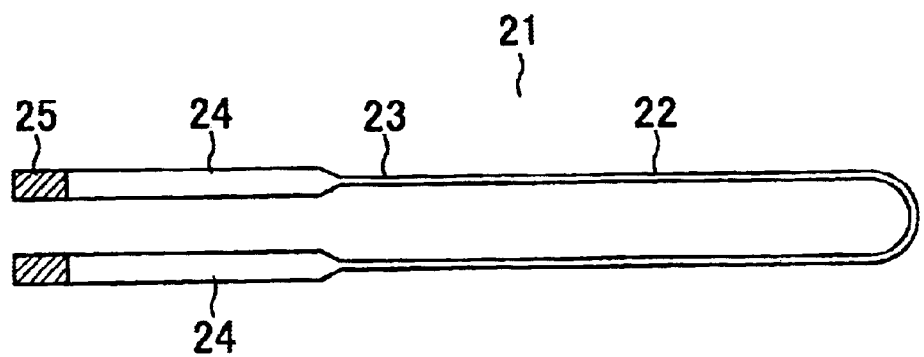
FIG. 5 is an explanatory diagram of a conventional U-shaped heater where terminals are welded to both ends of a U-shaped heating part.

When giving the parallel faces of each U-shaped heater member 1 an angle relative to each other and welding such faces, as depicted in FIG. 3 and FIG. 4, by providing an arc-shaped guide 15 for guiding and supporting the connected U-shaped heater members 1 in the connecting direction of such U-shaped heater members 1, the angle could be adjusted easier. Moreover, when changing the curvature of the curved surface of the arc-shaped heater or the size of the arc, by exchanging this arc-shaped guide 15, such change can be achieved easily. Further, FIG. 4 shows a condition where the terminal part 18 is retained between and connected to the vertical electrodes. In addition, for ease of understanding, only a part of the continuous arc-shaped heater 1 is shown in FIG. 4.

Although FIG. 3 illustrates two arc-shaped guides 15, as evident from the diagram, each of the connected U-shaped heater members 1 is alternately aligned horizontally of the welding portions of the electrodes, and the connected U-shaped heater members 1 are formed successively so as to rise along the arc-shaped guide 15.

It is desirable to provide an insulating body such as an insulation tape to the curved surface part of the arc-shaped guide 15 in order to prevent short circuits. Moreover, it is also possible to prevent the swaying of the heater, which may be caused by its empty weight, by providing an adhesive or cohesive material such as a double-sided tape or magic tape to the curved face part of the arc-shaped guide. It is thereby possible to yield an effect of stably retaining the heater along the curved surface of the arc-shaped guide 15.

With respect to the above, although a case was explained where the U-shaped heater members are connected one by one, by preparing two series-connected MoSi2 arc-shaped heater members having a specified arc length continuously formed beforehand in a U shape through welding or bending, aligning the end faces of the U-shaped heater members at the end parts of the arc-shaped heater members while retaining such arc-shaped heater members in parallel, and giving the parallel faces of each U-shaped heater member an angle relative to each other and welding such faces, it is also possible to connect, at the same time, the foregoing two series-connected MoSi2 arc-shaped heater members.

In order to install the MoSi2 arc-shaped heater around the entire inner periphery of the heating furnace, when forming an arc while continuously forming a U shape, much space is required throughout the manufacturing process, and a device is further required for supporting the overall arc-shaped heater during its manufacture.

Nevertheless, if a plurality of arc-shaped heaters of a half circle or having a specified length is prepared in advance and connected through welding, only a temporary space and temporary support of the arc-shaped heater will be necessary, and there is an advantage in that the manufacture and use of the device will be simple.

Furthermore, the arc-shaped heaters of a half circle or having a specified length prepared in advance do not necessarily have to be welded, and, for instance, there is an advantage in that they may be arc-shaped heaters continuously formed in a U shape through bending.

In general, since the arc-shaped heater continuously formed in a U shape through bending does not have a welding part, it has a characteristic in having a stronger strength in comparison to a welded heater, and, by leveraging such characteristic, a method may also be selected where numerous arc-shaped heaters are continuously formed in a U shape through bending, and thereafter connecting a portion thereof through welding. With the present device, the method and device for manufacturing such a $MoSi_2$ arc-shaped heater are also included therein.

The arc-shaped guide 15 for guiding and supporting the U-shaped heater member 1 or the curvature of the U-shaped heater member 1 is made to have a curvature approximately coinciding with, or slightly smaller than, the inner wall curvature surface of the heating furnace. Generally speaking, an arc-shaped heater is installed to a position roughly 2 to 5 mm apart from the inner wall of the heating furnace; that is, in a state where it has a slightly smaller diameter in the central direction of the furnace.

This is because the diffusion efficiency of the heater will deteriorate if the arc-shaped heater is mounted in contact with the inner wall of the furnace. Thus, it is also desirable that the arc-shaped guide for guiding and supporting such arc-shaped heater is slightly smaller than the curved surface of the inner wall of the furnace, and made to have a radius that is 2 to 5 mm smaller than such inner wall.

Therefore, the arc-shaped guide 15 for guiding and supporting the U-shaped heater member 1 of the present invention or the U-shaped heater 1 has a curvature approximately coinciding with, or slightly smaller than, the inner wall curved surface of the heating furnace, and includes such curvature.

The $MoSi_2$ arc-shaped heater of the present invention may be formed in a shape of being disposed at a part of the inner wall of the heating furnace, or half way or all around the inner wall of the heating furnace as a continuous $MoSi_2$ arc-shaped heater. For example, when the continuous $MoSi_2$ arc-shaped heater is disposed half way, two sets are prepared and disposed around the entire inner periphery of the heating furnace. Moreover, when forming partial arcs, arc-shaped heaters corresponding thereto are suitably prepared and arranged to enable the installation around the entire inner periphery of the heating furnace.

Mounting of the $MoSi_2$ arc-shaped heater to the terminal may be performed by exchanging the electrodes having the retention grooves matching the shape of the terminal, and welding such portion with the same device.

The present invention yields a significant characteristic in that obtained is an arc-shaped face having a specified curvature in a connecting direction by connecting a plurality of parallel U-shaped heater members having a heating part, giving the parallel parts of each U-shaped heater member an angle relative to each other and then welding such parts, and, as a result of the heater being provided with an overall arc-shaped curved surface capable of being installed in the inner wall of a heating furnace or the like, further obtained is a $MoSi_2$ arc-shaped heater superior in joining strength and capable of being manufactured stably.

What is claimed is:

1. A method of manufacturing a $MoSi_2$ arc-shaped heater formed as a continuous waveform in which a plurality of U-shaped heater members having opposed parallel parts are connected alternately to each other at end parts thereof, comprising the steps of:

aligning end faces of a pair of U-shaped heater members while said U-shaped heater members are retained in parallel;

welding said end faces of said U-shaped heater members while guiding and supporting said U-shaped heater members on an arc-shaped guide to provide an angle between faces of said U-shaped heater members to provide the heater with an arc-shaped face of a specified curvature in a connecting direction; and disposing the continuous $MoSi_2$ arc-shaped heater along an inner wall of a heating furnace.

2. A method according to claim 1, wherein said specified curvature is a curvature approximately coinciding with a curved surface of the inner wall of the heating furnace.

3. A method of manufacturing a $MoSi_2$ arc-shaped heater, comprising the steps of:

providing a separate pair of $MoSi_2$ arc-shaped heater members each having a specified arc length in which a plurality of U-shaped heater members extend alternately from each other to form a continuous waveform;

aligning end faces of said $MoSi_2$ arc-shaped heater members while retaining said end-faces in parallel;

welding said end faces to join said pair of $MoSi_2$ arc-shaped heater members and form a continuous waveform while guiding and supporting said pair of $MoSi_2$ arc-shaped heater members on an arc-shaped guide to provide an angle between faces of said joined $MoSi_2$ arc-shaped heater members to provide the heater with an arc-shaped face of a specified curvature in a connecting direction; and disposing the continuous waveform $MoSi_2$ arc-shaped heater along an inner wall of a heating furnace.

4. A method according to claim 3, wherein said plurality of U-shaped heater members that form said continuous waveforms of said MoSi$_2$ arc-shaped heater members are formed by welding separate U-shaped members together.

5. A method according to claim 3, wherein said plurality of U-shaped heater members that form said continuous waveforms of each of said MoSi$_2$ arc-shaped heater members are formed by bending a continuous member into U-shapes.

6. A method according to claim 3, wherein said specified curvature is a curvature approximately coinciding with a curved surface of the inner wall of the heating furnace.

7. An apparatus for manufacturing a MoSi$_2$ arc-shaped heater formed as a continuous waveform in which a plurality of U-shaped heater members having opposed parallel parts extend alternately to each other from end parts thereof, comprising:

- a set of electrodes for retaining a pair of said U-shaped heater members therebetween and for welding said end faces of said U-shaped heater members via electrical heating;
- a guide for aligning and retaining in parallel said end faces of said pair of U-shaped heater members retained between said electrodes;
- a device to cause said end faces of said U-shaped heater members to contact each other under an amount of pressure when said U-shaped heater members are retained between said electrodes; and
- an arc-shaped guide for guiding and supporting said U-shaped heater members in a connecting direction of said U-shaped heater members to provide an angle between faces of said U-shaped heater members to provide the heater with an arc-shaped face of a specified curvature in a connecting direction;

whereby a continuous MoSi$_2$ arc-shaped heater is produced that has a shape for being disposed around an inner wall of a heating furnace.

8. An apparatus according to claim 7, wherein said arc-shaped guide has a curvature approximately coinciding with a curved surface of the inner wall of the heating furnace.

9. An apparatus according to claim 7, wherein a curved surface part of said arc-shaped guide has an insulating body for preventing short circuits.

10. An apparatus according to claim 9, wherein said curved surface part of said arc-shaped guide carries one of an exposed adhesive and a cohesive material.

11. An apparatus according to claim 7, wherein a curved surface part of said arc-shaped guide carries one of an exposed adhesive and a cohesive material.

12. An apparatus according to claim 7, wherein said electrodes have an adjustment mechanism for adjusting a position of at least one of said U-shaped heater members in a vertical direction and for causing said U-shaped heater members to separate or contact each other.

13. An apparatus according to claim 12, wherein at least one of said electrodes is activated with a fluid pressure device so that said U-shaped heater member is retained between said set of electrodes under pressure.

14. An apparatus according to claim 13, wherein said electrodes retain said U-shaped heater members at a position spaced forward of a working point of said fluid pressure device that activates said electrodes.

15. An apparatus for manufacturing a MoSi$_2$ arc-shaped heater formed as a continuous waveform, comprising:

- a set of electrodes for retaining therebetween a separate pair of MoSi$_2$ arc-shaped heater members each having a specified arc length in which a plurality of U-shaped heater members extend alternately from each other to form a continuous waveform and for welding end faces of said MoSi$_2$ arc-shaped heater members via electrical heating;
- a guide for aligning and retaining in parallel said end faces of said pair of MoSi$_2$ arc-shaped heater members retained between said electrodes;
- a device to cause said end faces of said MoSi$_2$ arc-shaped heater members to contact each other under an amount of pressure when said MoSi$_2$ arc-shaped heater members are retained between said electrodes; and
- an arc-shaped guide for guiding and supporting said MoSi$_2$ arc-shaped heater members in a connecting direction of said MoSi$_2$ arc-shaped heater members to provide an angle between faces of said MoSi$_2$ arc-shaped heater members to provide the heater with an arc-shaped face of a specified curvature in a connecting direction;

whereby a continuous MoSi$_2$ arc-shaped heater is produced that has a shape for being disposed around an inner wall of a heating furnace.

* * * * *